US011109187B2

(12) United States Patent
Painter et al.

(10) Patent No.: US 11,109,187 B2
(45) Date of Patent: Aug. 31, 2021

(54) DEVICE TO DEVICE COMMUNICATION AND WAYFINDING

(71) Applicant: T-Mobile USA, Inc., Bellevue, WA (US)

(72) Inventors: Christopher Painter, Kirkland, WA (US); Maikel Faltaous, Renton, WA (US); Caesar Winebrenner, Des Moines, WA (US); Andre Sacaguti, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/920,285

(22) Filed: Jul. 2, 2020

(65) Prior Publication Data

US 2021/0092554 A1    Mar. 25, 2021

Related U.S. Application Data

(60) Provisional application No. 62/905,289, filed on Sep. 24, 2019.

(51) Int. Cl.
*H04W 4/02* (2018.01)
*H04W 8/00* (2009.01)
(Continued)

(52) U.S. Cl.
CPC .......... *H04W 4/023* (2013.01); *H04W 4/025* (2013.01); *H04W 4/029* (2018.02); *H04W 8/005* (2013.01); *H04W 76/14* (2018.02)

(58) Field of Classification Search
CPC ..... H04W 4/023; H04W 8/005; H04W 4/029; H04W 4/025; H04W 76/14
See application file for complete search history.

(56) References Cited

U.S. PATENT DOCUMENTS 9,723,439 B2    8/2017  Segev et al.
10,039,074 B1 *  7/2018  Sargent ................. H04W 64/00
(Continued)

FOREIGN PATENT DOCUMENTS

WO    WO-2013188717 A2 * 12/2013  .............. H04W 4/33
WO    WO-2016117926 A1 *  7/2016  .............. G01C 17/28

OTHER PUBLICATIONS

Automatic dependent surveillance—broadcast. Wikipedia, Apr. 16, 2020 [retrieved on Jul. 2, 2020] Retrieved from the Internet URL: <https://en.wikipedia.org/wiki/Automatic_dependent_surveillance_-_broadcast>.

(Continued)

*Primary Examiner* — Charles T Shedrick
(74) *Attorney, Agent, or Firm* — Han Santos, PLLC

(57) ABSTRACT

Mobile device users navigate to each other by their mobile devices sharing location information, and then one or more of the mobile devices receiving or generating geographical directions for presentation to the mobile device's user to navigate to another of the mobile devices. Two mobile devices can provide geographical directions to enable their respective users to navigate toward each other, and a group of mobile devices can receive and provide or display geographical directions to variously enable their respective users to navigate to different mobile devices in the group. In one scenario, first and second mobile devices provide geographical directions to their respective locations and a third mobile device provides geographical directions to the first or second mobile device, and directions are dynamically updated as the mobile devices move.

20 Claims, 3 Drawing Sheets

(51) Int. Cl.
*H04W 4/029* (2018.01)
*H04W 76/14* (2018.01)

(56) References Cited

U.S. PATENT DOCUMENTS

| | | | |
|---|---|---|---|
| 10,136,251 B2 | 11/2018 | Parab et al. | |
| 10,288,444 B2* | 5/2019 | Andrew | G01C 21/3679 |
| 10,299,073 B2 | 5/2019 | Cornwall et al. | |
| 10,423,688 B1 | 9/2019 | Patton et al. | |
| 10,511,939 B1* | 12/2019 | Wihardja | H04L 27/10 |
| 10,511,971 B1* | 12/2019 | Akpinar | G01C 21/3438 |
| 10,694,331 B1* | 6/2020 | Brooks Powell | H04W 4/023 |
| 2002/0169539 A1* | 11/2002 | Menard | G01C 21/26 701/532 |
| 2013/0144523 A1* | 6/2013 | Haney | H04L 67/22 701/482 |
| 2014/0171059 A1* | 6/2014 | Parker | H04M 1/27457 455/419 |
| 2015/0219458 A1* | 8/2015 | Shah | G01C 21/3438 701/522 |
| 2015/0296341 A1* | 10/2015 | Cecchini | H04L 67/18 455/456.2 |
| 2016/0191637 A1* | 6/2016 | Memon | H04L 67/18 701/522 |
| 2016/0196525 A1* | 7/2016 | Kantor | G08G 5/0013 705/330 |
| 2016/0300185 A1* | 10/2016 | Zamer | H04W 4/029 |
| 2017/0045627 A1* | 2/2017 | Larsson | H04B 7/08 |
| 2017/0064490 A1* | 3/2017 | Jin | H04W 4/029 |
| 2017/0115125 A1* | 4/2017 | Cutwater | H04W 4/40 |
| 2017/0188199 A1* | 6/2017 | Ashley, Jr. | H04W 4/80 |
| 2017/0272916 A1* | 9/2017 | Stewart | H04M 1/72572 |
| 2017/0295468 A1* | 10/2017 | Snyder | H04W 4/025 |
| 2018/0146011 A1* | 5/2018 | Nagao | G06F 21/44 |
| 2018/0176271 A1* | 6/2018 | Laurent | H04L 51/20 |
| 2019/0035171 A1* | 1/2019 | Jayanthi | G01C 21/26 |
| 2019/0297049 A1* | 9/2019 | Serad | H04L 51/32 |
| 2020/0042080 A1* | 2/2020 | Lyren | G06F 3/011 |
| 2020/0053510 A1* | 2/2020 | Snyder | H04W 4/025 |

OTHER PUBLICATIONS

Find your way. And find your way around. Apple.com [retrieved on Jul. 2, 2020] Retrieved from the Internet URL: <https://www.apple.com/ios/maps>.

Locate a friend in Find My on iPhone. Apple.com [retrieved on Jul. 2, 2020] Retrieved from the Internet URL: <https://support.apple.com/guide/iphone/locate-a-friend-ipha24eb4a37/ios>.

Wolfhound-PRO Cell Phone Detector. Berkeley Varitronics Systems, [retrieved on Jul. 2, 2020] Retrieved from the Internet URL: <https://www.bvsystems.com/product/wolfhound-pro-cell-phone-detector>.

* cited by examiner

DEVICE TO DEVICE COMMUNICATION AND WAYFINDING

BACKGROUND

In today's world mobile subscribers or users have user devices such as smart phones that can not only make telephone calls, but can also function as general purpose computing devices that run software applications and network with other computing devices, for example by enabling users to communicate and share different kinds of information with each other.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

In simple form, example embodiments variously encompass a process where a first mobile device (e.g., a child's personal mobile device such as a smart watch) displays or otherwise presents (e.g., via aural guidance and/or haptic feedback) directions or vectors to a user of the first mobile device, to direct the user to move (with the first mobile device) to a geographic location of a second mobile device (e.g., a parent's smartphone). The location of the second mobile device can be dynamic or changeable and the directions or instructions presented by the first mobile device can adapt accordingly as a location of the second mobile device changes. In example embodiments the second mobile device (e.g., the parent's smart phone) can display or convey progress updates and/or a current location of the first mobile device (the child's smart watch). In example embodiments, the second mobile device also presents directions to direct the user of the second mobile device to move toward and meet the user of the first mobile device.

One or more additional mobile devices can also become involved, and present directions that enable their users to navigate towards either the first mobile device or the second mobile device, and can present locations of, and communications from, the first and second mobile devices.

In example embodiments, each of the mobile devices receives information regarding its own geographic location, for example via Global Positioning System signals received by the mobile device and/or location data determined from interaction of the mobile device with local WiFi™ hotspots and/or wireless service provider network cell towers or base stations having known locations. In example embodiments the mobile devices share their respective geographic locations with each other via wireless communications, and one or more of the mobile devices generates or receives geographic directions or vectors toward another of the mobile devices, based on the shared geographic locations. These directions enable or direct users of the mobile devices to navigate toward and meet each other.

Figure 1:
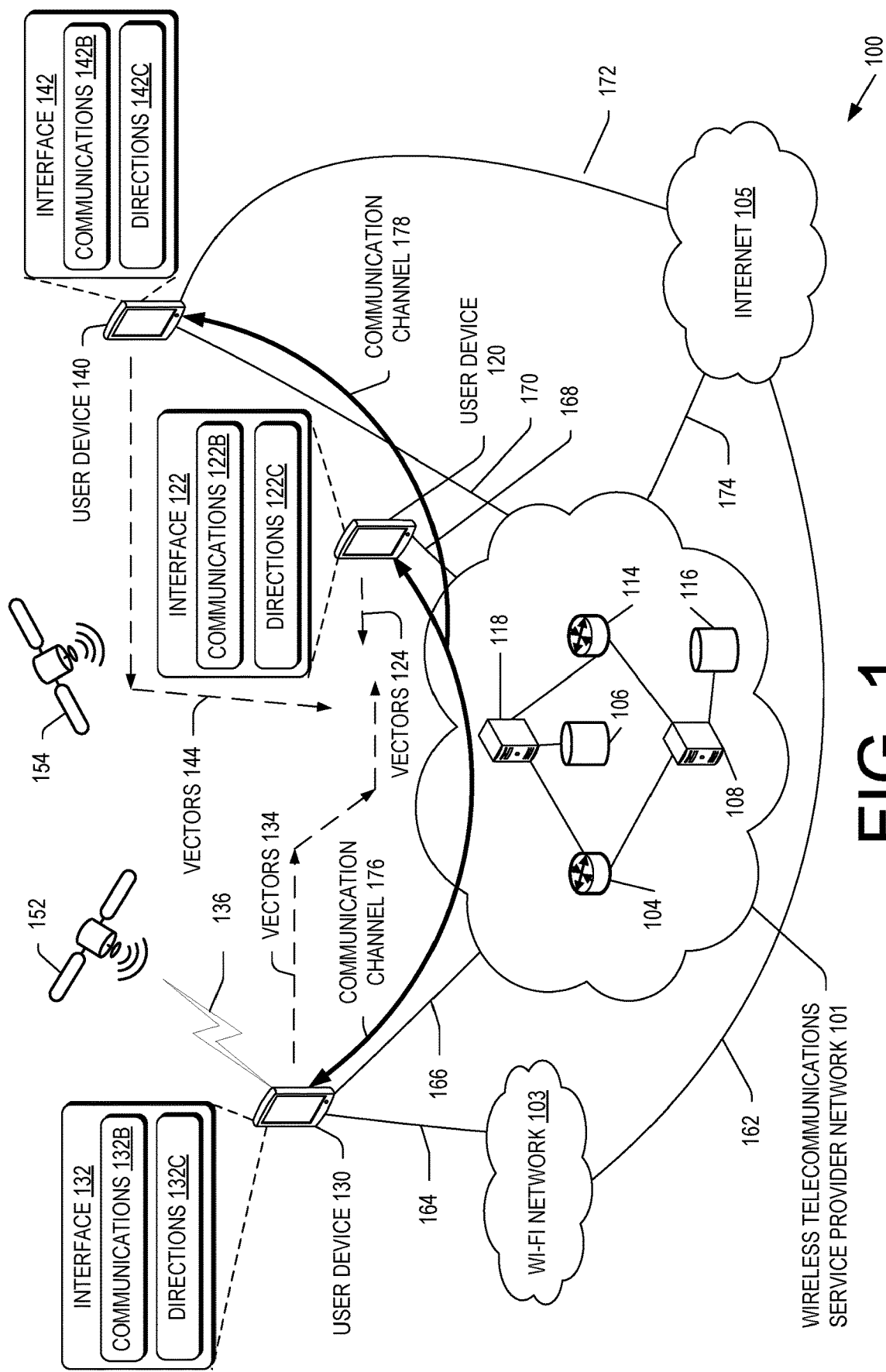
FIG. 1 shows an illustrative computing environment and network architecture for implementing techniques that enable user devices to share location and direction information so that users of the devices can communicate and navigate to each other.

FIG. 1 shows an illustrative computing environment 100 and network architecture to support communication and geographic navigation between user devices 120, 130, 140. The user devices 120, 130, 140 can be mobile devices or wireless communication devices such as smart phones, tablets, smart watches or other wearable or personal devices capable of wirelessly communicating with each other via WiFi™ networks, the Internet, and wireless telecommunications service providers. In example embodiments, one or more of the user devices 120, 130, 140 have accounts or subscriber agreements to receive wireless and optionally additional services from a wireless telecommunications service provider, for example, via a wireless telecommunications service provider network 101. Alternatively, one or more of the user devices 120, 130, 140 can receive those services via a roaming arrangement. As shown in FIG. 1, the user devices 130, 120 communicate via a communication channel 176 and also with the user device 140 via a communication channel 178 through the wireless telecommunications service provider network 101. The user devices 120, 130, 140 respectively have user interfaces 122, 132, 142. The interface 122 conveys communications 122B and directions 122C, and the interfaces 132, 142 likewise respectively convey communications 132B, 142B and directions 132C, 142C respectively. For example, in example embodiments the directions 132C guide or direct a user of the user device 130 to travel or move along the vectors or directions 134 to reach a geographical location of the user device 120. Similarly, the directions 122C guide or direct a user of the user device 120 to travel or move along the vectors or directions 124 to reach a geographical location of the user device 130, and the directions 142C guide or direct a user of the user device 140 to travel or move along the vectors or directions 144 to reach a geographical location of the user device 130.

Also shown in FIG. 1 are satellites 152, 154. In an example embodiment, one or both of the satellites 152, 154 convey Global Positioning System (GPS) signals to the user devices 120, 130, 140 via wireless downlinks such as the link 136. In an example embodiment, one or both of the satellites 152, 154 provide two-way communications to one or more of the user devices 120, 130, 140 to connect them with telecommunications services (e.g., to convey communications directly between two or more of the user devices 120, 130, 140, or indirectly through additional networks, for example, by connecting one or more of the user devices 120, 130, 140 to a wireless telecommunications service provider network such as the network 101 which in turn connects to others of the user devices 120, 130, 140). One or more of the user devices 120, 130, 140 can connect to WiFi™ networks and to the Internet. For example, FIG. 1 illustrates the user device 130 connected to a WiFi™ network 103 via a link 164, and the user device 140 connected to the Internet 105 via a link 172. Also shown are a link 162 connecting the WiFi™ network to the Internet 105, a link 174 between the Internet 105 and the wireless telecommunications service provider network 101, and links 168, 166, and 170 respectively between the user devices 120, 130, 140 and the wireless telecommunications service provider network 101.

The wireless telecommunications service provider network 101 contains appropriate infrastructure to support communications between the user devices 120, 130, 140 and also, in accordance with example embodiments, to support determining geographic locations of the user devices 120, 130, 140 (e.g., via cell tower or base station triangulation) and geographic directions or vector instructions for one or more of the user devices 120, 130, 140 to move toward another of the user devices 120, 130, 140. In particular, the wireless telecommunications service provider network 101 includes resources such as servers 104, 114, data stores 106, 116 and servers 108, 118 to variously support telecommunications services and functions.

In a first example embodiment, the user device 130 is a smart phone or smart watch that belongs to a child, and the user device 120 is a smart phone that belongs to a parent, and the child and parent are separated in a park such as a city park or a commercial theme park, and the parent decides that she would like the child to rejoin her. She sends a request, for example, via a navigation application on her smart phone, to or via a corresponding navigation application on the child's smart phone 130 for the child to make her way back to the parent. The applications share respective locations of the user devices 120, 130 (in this and other example embodiments each user device either knows its own geographic location based on received GPS signals and/or receives location information periodically from a wireless telecommunications service provider), and the application on the child's user device provides instructions or directions to the child via the interface 132 on how to navigate to the parent (i.e., the geographic location of the parent's user device 120). In example embodiments, the directions are requested by the application on the child's user device 130 or by the application on the parent's user device 120 from the wireless telecommunications service provider network 101 or third-party navigation service accessible through the Internet 105, which generates and sends the directions to the child's user device 130 for presentation to the child (and optionally to the parent's user device 120, to show a projected path of the child to the parent and/or provide progress updates to the parent on how the child is progressing in her journey back to the parent, optionally along with an estimated time of arrival, an elapsed duration of the journey, and so forth). The directions can be visual, for example, textual directions and/or images or arrows, vectors, or pathway(s) shown on a map, and/or aural (e.g., verbal instructions or simple tones to indicate proper direction and false directions), and/or haptic feedback (vibration patterns, frequencies, or intensities to indicate proper direction and false directions). The parent and child can also communicate with each other, for example, via text messages in the communications 132B of the interface 132 and/or the communications 122B of the interface 122, as part of the navigation applications and/or via regular text or voice smart phone communications between the user devices 120, 130. The user devices 120, 130 continue to periodically share location information, so that progress of the child in her journey is updated and continues to be reported to the parent, and so that, if the parent's location changes, then updated directions can be requested and sent to the child's user device 130 and optionally the parent's user device 120.

In a second embodiment similar to the first, the navigation process is triggered by the child requesting navigation to the parent, and an alert is optionally sent to the parent's user device 120 indicating that the child has made the request.

In a third embodiment similar to the first, the parent also requests navigation to the child, and consequently navigation instructions are requested and sent to the parent's smart phone (user device 120) to navigate the parent to the child (i.e., the child's smart phone or user device 130), and optionally also to the child's user device 130. In this embodiment both sets of navigation instructions are periodically updated or are updated as needed to reflect new locations of the user devices 120, 130 as the parent and child move along their respective journeys, and progress reports can be provided to both the parent and the child.

In a fourth embodiment similar to the third embodiment, navigation initially proceeds as outlined with respect to the first embodiment (the child is provided with navigation instructions to the parent). The parent also specifies or includes a time limit, so that if the child hasn't reached the parent by an expiration of the time limit, then the parent's user device 120 requests navigation to the child's user device 130 so that the parent can go find the child, as outlined with respect to the third embodiment. The time limit can be set in various ways. For example, the parent can explicitly set the time limit, can select a default time limit, or can select a function in the parent's navigation application (e.g., as a default selection or an active selection when the timeout function is selected or enabled) that determines the time limit based on an initial distance between the child's user device 130 and the parent's user device 120.

In a fifth embodiment similar to the fourth embodiment, upon expiration of the time limit, in addition to the (first) parent receiving navigation instructions to the child, a third person such as another parent of the child also receives navigation instructions to the child (via, for example, the user device 140), or navigation instructions to the first parent, in the same fashion as described above with respect to the third or fourth embodiments.

In a sixth embodiment that combines functions from the second embodiment with functions or operations from the fifth embodiment, the child requests navigation (via her user device 130) to the first parent (or the user device 120), and in response not only is she provided with directions to the first parent, but also both parents are alerted and provided with directions (via the user devices 120, 140) to the child (or the user device 130). This can be set up as a default when the child requests navigation to a parent or can be set to occur when the child requests navigation to a parent and also selects or sends a message to one or both parents that indicates urgency.

In a seventh embodiment that is a varied combination of the fourth and fifth embodiments, the child receives navigation instructions to a first parent (at the child's request, or at the first parent's request, or at the second parent's request) and then upon expiration of the time limit, the second parent also receives navigation instructions to the first parent, and the child and both parents are each apprised of the others' progress and locations.

In an eighth embodiment that builds on the first or second embodiments, after the child has begun navigation back to the first parent (user device 120), either the first parent or the second parent requests that the child be redirected to the second parent, so that updated navigation directions are sent to the child (i.e., the child's user device 130) to direct the child to the second parent (the user device 140). Thereafter, operation can optionally shift to any of the fifth, sixth, or seventh embodiments, with the roles of the first and second parents exchanged (e.g., with respect to adapting the seventh embodiment, upon expiration of the time limit, the first parent receives navigation instructions via the user device 120 to the second parent (i.e., the second parent's user device 140)).

In a ninth embodiment that builds on the fourth and eighth embodiments, after the child begins navigation back to the first parent, upon expiration of a time period, the child is redirected to the second parent, so that updated navigation directions are sent to the child (i.e., the child's user device 130) to direct the child to the second parent (the user device 140). Thereafter, operation can optionally shift to any of the fifth, sixth, or seventh embodiments, with the roles of the first and second parents exchanged (e.g., with respect to adapting the seventh embodiment, upon expiration of the time limit, the first parent receives navigation instructions via the user device 120 to the second parent (i.e., the second parent's user device 140)). As in the fourth embodiment, the time limit can be set in various ways. For example, either the first or second parent can explicitly set the time limit, can select a default time limit, or can select a function in the first or second parent's navigation application (e.g., as a default selection or an active selection when the timeout function is selected or enabled) that determines the time limit based on an initial distance between the child's user device 130 and the first parent's user device 120, or between the child's user device 130 and the second parent's user device 140.

Additional features can be variously provided in the example embodiments described herein. For example, if one of the user devices strays beyond a threshold distance from navigation path, then alerts or warnings and optionally additional navigation instructions can be provided to the straying user device or other user devices to redirect the straying user and/or vector other users to the straying user. The threshold distance can, for example, be predetermined, set by one or more of the users, or dynamically determined based on geographic features of terrain to be navigated or safety issues such as proximity to a busy street or crowded area. In example embodiments, security protocols can be employed, for example, to provide or limit a child's navigation options to a select or approved list of other user devices or mobile devices, and to allow emergency overrides (either to expand service/navigation options or contract them) based on inclement weather conditions, urgency of successfully brings mobile device users together, and so forth. In example embodiments, navigation can be automatically invoked not just upon expiration of time limits as variously described herein, but also on other conditions, including for example, when a parent's query to a child is not answered with a predetermined time interval, or is answered in a particular way that indicates a need or likelihood for navigation to be provided. Different navigation paths or navigation criteria can also be specified, for example, by a parent requesting that a child receive geographic directions to navigate to the parent, based on time to travel the navigation path, safety of the navigation path, or other factors that might affect success or efficiency of the navigation endeavor—for example, to route the child past a particular landmark or location, or to make it easier for the parent or another parent or trusted party to intercept and meet or join the child along the navigation path.

Further variations and implementation details are available in example embodiments. For example, any appropriate location services or location techniques or combinations thereof can be used, including but not limited to GPS positioning, cell tower/base station triangulation, WiFi™ network proximity or triangulation, self-reporting of a user via their user device 120, 130, 140 of proximity to a known landmark or street address, and so forth. Geographic directions or vectors or other journey instructions can be generated by a wireless telecommunications service provider (e.g., by resources on the network 101 or by cloud computing resources available to the wireless telecommunications service provider), by computation or navigation functions resident on one or more of the user devices 120, 130, 140, or can be generated by one or more third parties accessible, for example, via the Internet 105 as requested directly by one or more of the user devices 120, 130, 140 or indirectly by a wireless telecommunications service provider (e.g., via the network 101) with which the user device(s) has an account or service contract. In addition, although a child and two parents are variously described herein with respect to example embodiments, other example embodiments consistent with the principles and operations and functions described herein can be implemented with respect to different entities and different numbers of entities. For example, various embodiments can include multiple children, embodiments can be adapted to be used by multiple people in commercial, government or military relationships and activities, and so forth.

Figure 2:
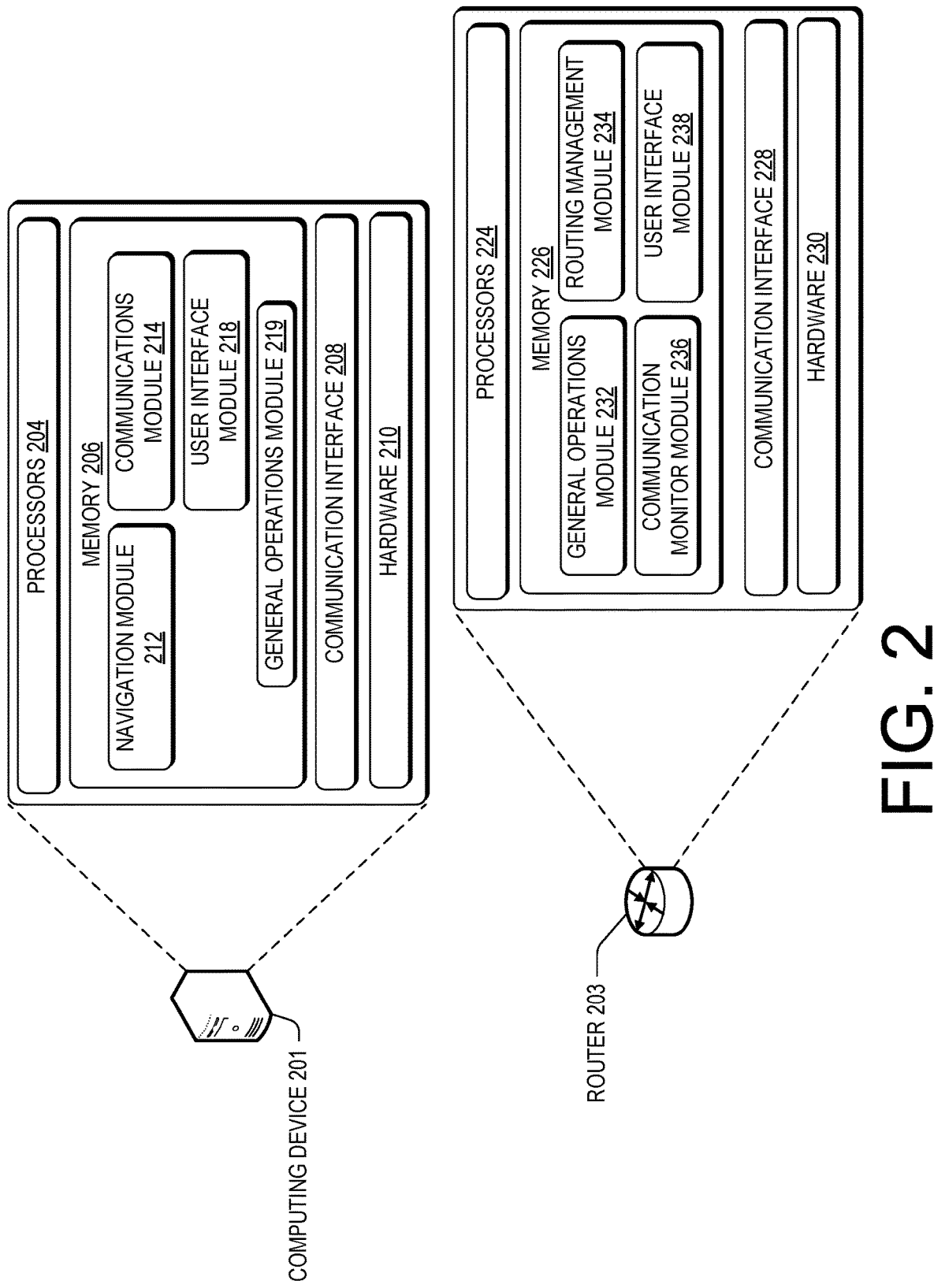
FIG. 2 shows illustrative details for various servers and other devices to implement different aspects of the architecture shown in FIG. 1.

FIG. 2 shows illustrative details of a computing device 201 and a router 203 that can support, or be variously implemented as, the system components and functions shown in FIG. 1 and/or functions described herein with respect to various embodiments and scenarios.

Figure 3:
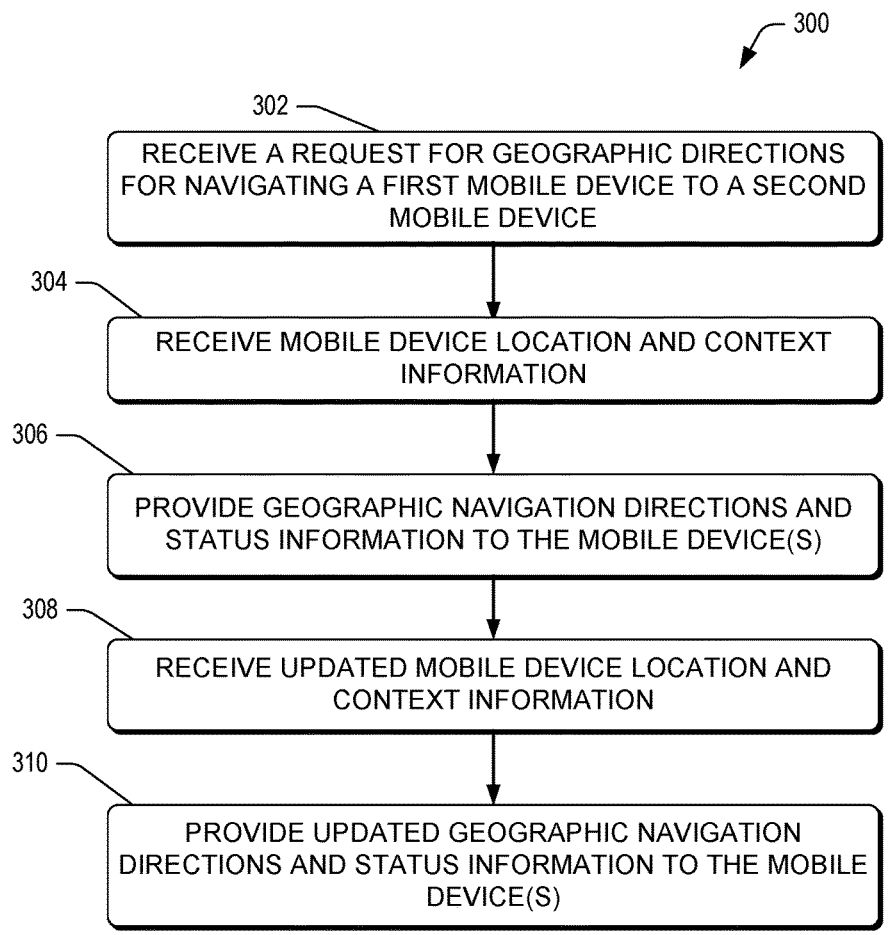
FIG. 3 is a flow diagram of an illustrative process for implementing techniques that enable users to communicate and navigate to each other using their personal devices.

One or more instances of the computing device 201 can, for example, form a basis for the user devices 120, 130, 140 as well as for other equipment and functions of the wireless telecommunications service provider network 101, including for example, the servers 108, 118 as well as various functions described with respect to the process of FIG. 3. Instances of the computing device 201 can also support various functions within the networks 101. The computing device 201 includes processors 204, hardware 210, and a communication interface 208, that can for example, implement the interfaces 122, 132, 142 and provide the communications information 122B, 132B, 142B and the directions information 122C, 132C, 142C. The computing device 201 also has a memory 206 that includes (but is not limited to) the various software modules shown. The navigation module 212 can process received navigation information for display via the communication interface 208, and optionally can generate geographic navigation information or directions based on received and/or stored geographic position information. The communications module 214 can support communication monitoring and analysis functions of the servers 108, 118 and routers 104, 114 to support functions of the wireless telecommunications service provider network 102 as described herein, for example, to support and monitor the communication channels 176, 178 and other communications between entities variously shown in FIG. 1 and described herein, as well as communication functions in the user devices 120, 130, 140, and can implement and adjust communication functions in cooperation with the communication interface 208. The general operations module 219 can support different functions of various applications running on the computing device 201 including tasks delegated from other devices or services. The user interface module 218 can provide user interface functions and capability for the user devices 120, 130, 140 as well as for the servers 108, 118 to enable users and administrators or technicians to access and operate the user device(s), servers and associated machinery.

One or more instances of the router 203 can be variously located within and support routing functions within the wireless telecommunications service provider network 101. The router 203 includes processors 224, a communication interface 228, hardware 230, and a memory 226 that contains various software modules including a routing management module 234 that supports various routing functions of the router 203. A communication monitor module 236 can support monitoring of communications between the router 203 and other entities, for example, the Wi-Fi network 103, the Internet 105 and the user devices 120, 130, 140, to support analysis and management functions performed by the servers 108, 118 or other elements of the wireless telecommunications service provider or wireless telecommunications service provider network 101 with respect to the services and communications described herein. Also included are a user interface module 238 to facilitate direct communications with a human operator if needed, and a general operations module 232 that can enable the router 203 to accept and accomplish various tasks for the system or subsystem to which it more particularly belongs.

The memories 206, 226 optionally include computer-readable storage media. Computer-readable storage media can include or encompass volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave.

FIG. 3 illustrates a process 300 that encompasses embodiments and scenarios variously described herein. In a first block 302, a request is received for geographic directions provide to a user to navigate the user's mobile device to a location of another user's mobile device. As described herein with respect to different embodiments, the request can be received by a wireless telecommunications service provider network or other central service or computing facility (real, virtual, or composed of distributed but coordinated computing functions and capability) such as a service in cloud accessed via the network or the Internet, and can originate from a user via the user's device. In accordance with various embodiments described herein, the user originating the request can be a user desiring navigation directions to another user's device, or can be a first user desiring that a second user navigate to the first user, or both (the first and second users navigate to each other, and possibly additional users also navigate to the first and/or second users). In example embodiments, one of the user devices, or multiple user devices acting in coordination, can provide functions of the central service to generate and appropriately share geographic directions based on mobile device locations. From block 302 the process moves to block 304. The mobile devices described with respect to FIG. 3 correspond to the user devices 120, 130, 140 shown in FIG. 2 and encompass user devices generally and variously described herein.

In block 304, geographic locations of the mobile devices are received, for example, by a central authority, along with any context information (such as requests and request origins, applicable rules such as time limits described herein with respect to various embodiments). In this block, location information can also be shared, so that involved mobile devices receive or report their own locations and also receive location information pertaining to other mobile devices to which they will be directed and/or which will be directed to them. From block 304 the process moves to block 306.

In block 306, geographic navigation directions are provided to the mobile devices in accordance with various embodiments described herein, for example, to a first mobile device for navigating to a second mobile device as in the first embodiment, and to second and optionally third mobile devices for navigating to the first mobile device (or the other of the second or third mobile device) consistent with embodiments variously described herein. Status information is also conveyed, for example, progress of the first mobile device along its journey or path to the second mobile device is reported to the second mobile device for presentation or display to the second user (or user of the second mobile device). As noted elsewhere herein, the geographic navigation directions are variously generated by a wireless telecommunications service provider network, by one or more of the user devices or mobile devices, and/or by third-party or computational cloud resources accessible to the wireless telecommunications service provider or third party. From block 306, the process moves to block 308.

In block 308, updated mobile device location(s) and updated context information are received. For example, new locations reflecting movement of one or more of the mobile devices is shared and geographic navigation directions are updated accordingly and sent out to appropriate ones of the mobile devices, along with updated context information, which can include, for example, status information such as journey progress, proximity or degree of adherence of mobile devices to (or deviation from) directed navigation paths, or in other words, paths that the navigation directions direct mobile device(s) (or in other words their users) to follow along. Context information can also include information based on which rules are invoked and geographic navigation directions are updated or changed, for example, expirations of time as described for example with respect to various embodiments such as the fourth, sixth and seventh embodiments described herein. From block 308 the process moves to block 310.

In block 310, updated geographic navigation directions and status information are provided to the mobile devices in accordance with various embodiments described herein, so that the directions and information can be presented or displayed on the mobile devices for their respective users to act upon. The geographic navigation directions and status information are updated, for example, based on the location and context information received in block 308. The subprocess of blocks 308 and 310 can for example be repeated until involved mobile devices are co-located, one or more users of the mobile devices opt out of the process, or one or more other end conditions occur such as timing, failure of service, mobile device battery reserves below predetermined or critical levels, and so forth. The process shown in FIG. 3 can also be repeated, and appropriately re-arranged. For example, requests can be received midway through an existing process, as described for example with respect to the eighth embodiment.

Various embodiments provide technical advantages that enable greater service and functionality to be provided to users with greater efficiency and lower resource cost. For example, instead of requiring users to acquire and deploy specialized equipment to implement and use geographic wayfinding to navigate to each other, existing equipment and capabilities can be advantageously applied to provide greater functionality to users via their wireless mobile device without requiring additional devices or infrastructure, thus conserving material resources and energy.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for communicating between first and second wireless communication devices, comprising:

receiving location information from the first wireless communication device indicating a geographic location of the first wireless communication device;

sending the geographic location of the first wireless communication device to the second wireless communication device;

receiving location information from the second wireless communication device indicating a geographic location of the second wireless communication device;

sending the geographic location of the second wireless communication device to the first wireless communication device;

sending directions to the first wireless communication device for presentation to a first user for geographically navigating the first wireless communication device to the second wireless communication device;

determining a time interval for the first user to geographically navigate the first wireless communication device to the geographic location of the second wireless communication device;

sending updated directions to the first wireless communication device for geographically navigating the first wireless communication device to the second wireless communication device, based on changes in at least one of the geographic location of the first wireless communication device or the geographic location of the second wireless communication device;

determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device;

based on determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device, determining additional directions for a third user to geographically navigate a third wireless communication device to the geographic location of the second wireless communication device;

sending the additional directions to the third wireless communication device for presentation to the third user for geographically navigating the third wireless communication device to the first wireless communication device;

sending an updated location of the first wireless communication device to the second wireless communication device and the third wireless device; and based on the updated location sending a first alert to a second user of the second wireless communication device indicating geographic movement of the first wireless communication device and a second alert to the third user of the third wireless communication device indicating the geographic movement of the first wireless communication device.

2. The method of claim 1, further comprising:

receiving a request from the second wireless communication device; and in response to the request, sending the directions to the first wireless communication device for presentation to the first user for geographically navigating the first wireless communication device to the second wireless communication device.

3. The method of claim 1, further comprising:

sending directions to the second wireless communication device for presentation to the second user for geographically navigating the second wireless communication device to the first wireless communication device; and sending updated directions to the second wireless communication device for presentation to the second user for geographically navigating the second wireless communication device to the first wireless communication device, based on changes in at least one of the geographic location of the first wireless communication device or the geographic location of the second wireless communication device.

4. The method of claim 1, further comprising:

receiving location information from the third wireless communication device indicating a geographic location of the third wireless communication device;

sending the geographic location of the second wireless communication device to the third wireless communication device;

in response to determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device, sending directions to the second wireless communication device for presentation to the second user for geographically navigating the second wireless communication device to the first wireless communication device;

sending updated directions to the second wireless communication device for presentation to the second user for geographically navigating the second wireless communication device to the first wireless communication device, based on changes in at least one of the geographic location of the first wireless communication device or the geographic location of the second wireless communication device; and sending updated directions to the third wireless communication device for presentation to the third user for geographically navigating the third wireless communication device to the first wireless communication device, based on changes in at least one of the geographic location of the first wireless communication device or the geographic location of the third wireless communication device.

5. The method of claim 1, further comprising:
receiving location information from the third wireless communication device indicating a geographic location of the third wireless communication device;
sending the geographic location of the second wireless communication device to the third wireless communication device;
sending updated directions to the third wireless communication device for presentation to the third user for geographically navigating the third wireless communication device to the second wireless communication device, based on changes in at least one of the geographic location of the second wireless communication device or the geographic location of the third wireless communication device.

6. The method of claim 1, further comprising:
receiving a request from the first wireless communication device, wherein the sending of the directions to the first wireless communication device for presentation to the first user for geographically navigating the first wireless communication device to the second wireless communication device, is performed in response to the request;
receiving location information from the third wireless communication device indicating a geographic location of the third wireless communication device;
sending the geographic locations of the first and second wireless communication devices to the third wireless communication device;
sending directions to the second wireless communication device for presentation to the second user for geographically navigating the second wireless communication device to the first wireless communication device;
sending updated directions to the second wireless communication device for presentation to the second user for geographically navigating the second wireless communication device to the first wireless communication device, based on changes in at least one of the geographic location of the first wireless communication device or the geographic location of the second wireless communication device; and
sending updated directions to the third wireless communication device for presentation to the third user for geographically navigating the third wireless communication device to the first wireless communication device, based on changes in at least one of the geographic location of the first wireless communication device or the geographic location of the third wireless communication device.

7. The method of claim 6, further comprising:
receiving a request to redirect the first wireless communication device from the second wireless communication device to the third wireless communication device;
in response to the request, sending directions to the first wireless communication device for presentation to the first user for geographically navigating the first wireless communication device to the third wireless communication device; and
sending an alert to the first wireless communication device for presentation to the first user, to the second wireless communication device for presentation to the second user, and to the third wireless communication device for presentation to the third user, indicating that the first wireless communication device is being directed to the third wireless communication device.

8. A network device, comprising:
at least one processor;
a network interface;
a storage device coupled to at least one processor; and
software instructions stored in the storage device, wherein execution of the software instructions by the at least one processor configures the network device to perform:
receiving location information from the first wireless communication device indicating a geographic location of the first wireless communication device;
sending the geographic location of the first wireless communication device to the second wireless communication device;
receiving location information from the second wireless communication device indicating a geographic location of the second wireless communication device;
sending the geographic location of the second wireless communication device to the first wireless communication device;
sending directions to the first wireless communication device for presentation to a first user for geographically navigating the first wireless communication device to the second wireless communication device;
determining a time interval for the first user to geographically navigate the first wireless communication device to the geographic location of the second wireless communication device;
sending updated directions to the first wireless communication device for geographically navigating the first wireless communication device to the second wireless communication device, based on changes in at least one of the geographic location of the first wireless communication device or the geographic location of the second wireless communication device;
determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device;
based on determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device, determining additional directions for a third user to geographically navigate a third wireless communication device to the geographic location of the second wireless communication device;
sending the additional directions to the third wireless communication device for presentation to the third user for geographically navigating the third wireless communication device to the first wireless communication device;

sending an updated location of the first wireless communication device to the second wireless communication device and the third wireless device; and based on the updated location sending a first alert to a second user of the second wireless communication device indicating geographic movement of the first wireless communication device and a second alert to the third user of the third wireless communication device indicating the geographic movement of the first wireless communication device.

9. The network device of claim 8, wherein execution of the software instructions by the at least one processor configures the network device to perform:

receiving a request from the second wireless communication device; and in response to the request, sending the directions to the first wireless communication device for presentation to the first user for geographically navigating the first wireless communication device to the second wireless communication device.

10. The network device of claim 8, wherein execution of the software instructions by the at least one processor configures the network device to perform:

sending directions to the second wireless communication device for presentation to the second user for geographically navigating the second wireless communication device to the first wireless communication device; and sending updated directions to the second wireless communication device for presentation to the second user for geographically navigating the second wireless communication device to the first wireless communication device, based on changes in at least one of the geographic location of the first wireless communication device or the geographic location of the second wireless communication device.

11. The network device of claim 8, wherein execution of the software instructions by the at least one processor configures the network device to perform:

receiving location information from the third wireless communication device indicating a geographic location of the third wireless communication device;

sending the geographic location of the second wireless communication device to the third wireless communication device;

in response to determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device, sending directions to the second wireless communication device for presentation to the second user for geographically navigating the second wireless communication device to the first wireless communication device;

sending updated directions to the second wireless communication device for presentation to the second user for geographically navigating the second wireless communication device to the first wireless communication device, based on changes in at least one of the geographic location of the first wireless communication device or the geographic location of the second wireless communication device; and sending updated directions to the third wireless communication device for presentation to the third user for geographically navigating the third wireless communication device to the first wireless communication device, based on changes in at least one of the geographic location of the first wireless communication device or the geographic location of the third wireless communication device.

12. The network device of claim 8, wherein execution of the software instructions by the at least one processor configures the network device to perform:

receiving location information from the third wireless communication device indicating a geographic location of the third wireless communication device;

sending the geographic location of the second wireless communication device to the third wireless communication device;

and sending updated directions to the third wireless communication device for presentation to the third user for geographically navigating the third wireless communication device to the second wireless communication device, based on changes in at least one of the geographic location of the second wireless communication device or the geographic location of the third wireless communication device.

13. The network device of claim 8, wherein execution of the software instructions by the at least one processor configures the network device to perform:

receiving a request from the first wireless communication device, wherein the sending of the directions to the first wireless communication device for presentation to the first user for geographically navigating the first wireless communication device to the second wireless communication device, is performed in response to the request;

receiving location information from the third wireless communication device indicating a geographic location of the third wireless communication device;

sending the geographic locations of the first and second wireless communication devices to the third wireless communication device;

sending directions to the second wireless communication device for presentation to the second user for geographically navigating the second wireless communication device to the first wireless communication device;

sending updated directions to the second wireless communication device for presentation to the second user for geographically navigating the second wireless communication device to the first wireless communication device, based on changes in at least one of the geographic location of the first wireless communication device or the geographic location of the second wireless communication device; and sending updated directions to the third wireless communication device for presentation to the third user for geographically navigating the third wireless communication device to the first wireless communication device, based on changes in at least one of the geographic location of the first wireless communication device or the geographic location of the third wireless communication device.

14. The network device of claim 13, wherein execution of the software instructions by the at least one processor configures the network device to perform:

receiving a request to redirect the first wireless communication device from the second wireless communication device to the third wireless communication device;

in response to the request, sending directions to the first wireless communication device for presentation to the first user for geographically navigating the first wireless communication device to the third wireless communication device; and sending an alert to the first wireless communication device for presentation to the first user, to the second wireless communication device for presentation to the second user, and to the third wireless communication device for presentation to the third user, indicating that the first wireless communication device is being directed to the third wireless communication device.

15. A computer readable storage medium comprising instructions that, when executed by at least one processor, cause the processor to perform:

receiving location information from the first wireless communication device indicating a geographic location of the first wireless communication device;

sending the geographic location of the first wireless communication device to the second wireless communication device;

receiving location information from the second wireless communication device indicating a geographic location of the second wireless communication device;

sending the geographic location of the second wireless communication device to the first wireless communication device;

sending directions to the first wireless communication device for presentation to a first user for geographically navigating the first wireless communication device to the second wireless communication device;

determining a time interval for the first user to geographically navigate the first wireless communication device to the geographic location of the second wireless communication device;

sending updated directions to the first wireless communication device for geographically navigating the first wireless communication device to the second wireless communication device, based on changes in at least one of the geographic location of the first wireless communication device or the geographic location of the second wireless communication device;

determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device;

based on determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device, determining additional directions for a third user to geographically navigate a third wireless communication device to the geographic location of the second wireless communication device;

sending the additional directions to the third wireless communication device for presentation to the third user for geographically navigating the third wireless communication device to the first wireless communication device;

sending an updated location of the first wireless communication device to the second wireless communication device and the third wireless device; and based on the updated location sending a first alert to a second user of the second wireless communication device indicating geographic movement of the first wireless communication device and a second alert to the third user of the third wireless communication device indicating the geographic movement of the first wireless communication device.

16. The computer readable storage medium of claim 15, further comprising instructions that, when executed by at least one processor, cause the processor to perform:

sending directions to the second wireless communication device for presentation to the second user for geographically navigating the second wireless communication device to the first wireless communication device; and sending updated directions to the second wireless communication device for presentation to the second user for geographically navigating the second wireless communication device to the first wireless communication device, based on changes in at least one of the geographic location of the first wireless communication device or the geographic location of the second wireless communication device.

17. The computer readable storage medium of claim 15, further comprising instructions that, when executed by at least one processor, cause the processor to perform:

receiving location information from the third wireless communication device indicating a geographic location of the third wireless communication device;

sending the geographic location of the second wireless communication device to the third wireless communication device;

in response to determining that the time interval has elapsed since sending the directions to the first wireless communication device for presentation to the first user for geographically navigating the first wireless communication device to the second wireless communication device and before the first user has geographically navigated the first wireless communication device to the geographic location of the second wireless communication device, sending directions to the second wireless communication device for presentation to the second user for geographically navigating the second wireless communication device to the first wireless communication device;

sending updated directions to the second wireless communication device for presentation to the second user for geographically navigating the second wireless communication device to the first wireless communication device, based on changes in at least one of the geographic location of the first wireless communication device or the geographic location of the second wireless communication device; and sending updated directions to the third wireless communication device for presentation to the third user for geographically navigating the third wireless communication device to the first wireless communication device, based on changes in at least one of the geographic location of the first wireless communication device or the geographic location of the third wireless communication device.

18. The computer readable storage medium of claim 15, further comprising instructions that, when executed by at least one processor, cause the processor to perform:
    receiving location information from the third wireless communication device indicating a geographic location of the third wireless communication device;
    sending the geographic location of the second wireless communication device to the third wireless communication device;
    and
    sending updated directions to the third wireless communication device for presentation to the third user for geographically navigating the third wireless communication device to the second wireless communication device, based on changes in at least one of the geographic location of the second wireless communication device or the geographic location of the third wireless communication device.

19. The computer readable storage medium of claim 15, further comprising instructions that, when executed by at least one processor, cause the processor to perform:
    receiving a request from the first wireless communication device, wherein the sending of the directions to the first wireless communication device for presentation to the first user for geographically navigating the first wireless communication device to the second wireless communication device, is performed in response to the request;
    receiving location information from the third wireless communication device indicating a geographic location of the third wireless communication device;
    sending the geographic locations of the first and second wireless communication devices to the third wireless communication device;
    sending directions to the second wireless communication device for presentation to the second user for geographically navigating the second wireless communication device to the first wireless communication device;
    sending updated directions to the second wireless communication device for presentation to the second user for geographically navigating the second wireless communication device to the first wireless communication device, based on changes in at least one of the geographic location of the first wireless communication device or the geographic location of the second wireless communication device; and
    sending updated directions to the third wireless communication device for presentation to the third user for geographically navigating the third wireless communication device to the first wireless communication device, based on changes in at least one of the geographic location of the first wireless communication device or the geographic location of the third wireless communication device.

20. The computer readable storage medium of claim 19, further comprising instructions that, when executed by at least one processor, cause the processor to perform:
    receiving a request to redirect the first wireless communication device from the second wireless communication device to the third wireless communication device;
    in response to the request, sending directions to the first wireless communication device for presentation to the first user for geographically navigating the first wireless communication device to the third wireless communication device; and
    sending an alert to the first wireless communication device for presentation to the first user, to the second wireless communication device for presentation to the second user, and to the third wireless communication device for presentation to the third user, indicating that the first wireless communication device is being directed to the third wireless communication device.

* * * * *